(12) United States Patent
Tong et al.

(10) Patent No.: US 11,323,143 B1
(45) Date of Patent: May 3, 2022

(54) DEVICE AND METHOD FOR WIRELESS TRANSMISSION

(71) Applicant: BESTECHNIC (SHANGHAI) CO., LTD., Shanghai (CN)

(72) Inventors: Weifeng Tong, Shanghai (CN); Liang Zhang, Shanghai (CN); Zhiqi Wang, Shanghai (CN)

(73) Assignee: BESTECHNIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/388,306

(22) Filed: Jul. 29, 2021

(30) Foreign Application Priority Data

Jun. 2, 2021 (CN) .......................... 202110611226.5

(51) Int. Cl.
| | | |
|---|---|---|
| *H04B 1/04* | (2006.01) | |
| *H04B 1/62* | (2006.01) | |
| *H04B 1/10* | (2006.01) | |
| *H04L 25/03* | (2006.01) | |
| *H03G 1/00* | (2006.01) | |

(52) U.S. Cl.
CPC ................. *H04B 1/04* (2013.01); *H04B 1/62* (2013.01); *H04B 2001/0425* (2013.01); *H04B 2001/0433* (2013.01)

(58) Field of Classification Search
None
See application file for complete search history.

(56) References Cited

U.S. PATENT DOCUMENTS

| | | | | |
|---|---|---|---|---|
| 9,461,592 | B2 * | 10/2016 | Matsubara | ............... H03F 3/19 |
| 10,148,230 | B2 * | 12/2018 | Xu | ........................ H03F 1/0261 |
| 11,115,068 | B2 * | 9/2021 | Kasargod | ............. H04B 1/0475 |
| 2006/0062324 | A1 * | 3/2006 | Naito | ..................... H03C 3/406 |
| | | | | 375/296 |
| 2011/0235734 | A1 * | 9/2011 | Kenington | ........... H04B 7/0623 |
| | | | | 375/267 |
| 2012/0002752 | A1 * | 1/2012 | Coan | .................... H04B 1/0475 |
| | | | | 375/297 |
| 2021/0367564 | A1 * | 11/2021 | Hausmair | ................ H03F 3/24 |

* cited by examiner

*Primary Examiner* — Pablo N Tran
(74) *Attorney, Agent, or Firm* — Bayes PLLC

(57) ABSTRACT

In certain aspects, a device for wireless transmission includes a transmission path, a feedback path, and a DPD control module. The transmission path includes a digital pre-distortion (DPD) conversion module configured to perform pre-distortion processing on an amplitude and a phase of a transmission signal based on a pre-distortion processing strategy. The transmission path further includes a power amplifier coupled to a downstream of the DPD conversion module and configured to amplify a power of the transmission signal. The feedback path is coupled to the transmission path at the downstream of the power amplifier and configured to generate a feedback signal. The DPD control module is coupled to the feedback path and the DPD conversion module and configured to adjust the pre-distortion processing strategy based on an amplitude difference and a phase difference between the transmission signal and the feedback signal.

20 Claims, 8 Drawing Sheets

300

310

410

420

DEVICE AND METHOD FOR WIRELESS TRANSMISSION

CROSS-REFERENCE TO RELATED APPLICATIONS

This application claims the benefit of priorities to Chinese Patent Application No. 202110611226.5, filed on Jun. 2, 2021, which is incorporated herein by reference in its entirety.

BACKGROUND

The present disclosure relates to devices for wireless transmission and processing methods thereof.

Power amplifiers may play an inseparable role in a wireless communication system. For example, a power of a transmission signal generated by a modulation oscillator circuit can be relatively small and not suitable for transmission directly. The transmission signal may need to go through a series of amplification stages including, e.g., a buffer stage, an intermediate amplification stage, and a final power amplification stage. In this case, one or more power amplifiers may be needed to implement the series of amplification stages. After processing the transmission signal using the one or more power amplifiers, the transmission signal can be fed into an antenna and transmitted to a receiver.

SUMMARY

In one aspect, a device for wireless transmission includes a transmission path, a feedback path, and a digital pre-distortion (DPD) control module. The transmission path includes a DPD conversion module configured to perform pre-distortion processing on an amplitude and a phase of a transmission signal based on a pre-distortion processing strategy. The transmission path further includes a power amplifier coupled to a downstream of the DPD conversion module and configured to amplify a power of the transmission signal. The feedback path is coupled to the transmission path at the downstream of the power amplifier and configured to generate a feedback signal. The DPD control module is coupled to the feedback path and the DPD conversion module and configured to adjust the pre-distortion processing strategy based on an amplitude difference and a phase difference between the transmission signal and the feedback signal.

In another aspect, a method for wireless transmission is disclosed. Pre-distortion processing is performed on an amplitude and a phase of a transmission signal based on a pre-distortion processing strategy. A power of the transmission signal is amplified. The transmission signal is transmitted through a transmitting antenna. A feedback signal is generated through a coupling of the transmission signal. The pre-distortion processing strategy is adjusted based on an amplitude difference and a phase difference between the transmission signal and the feedback signal.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

Figure 1A:
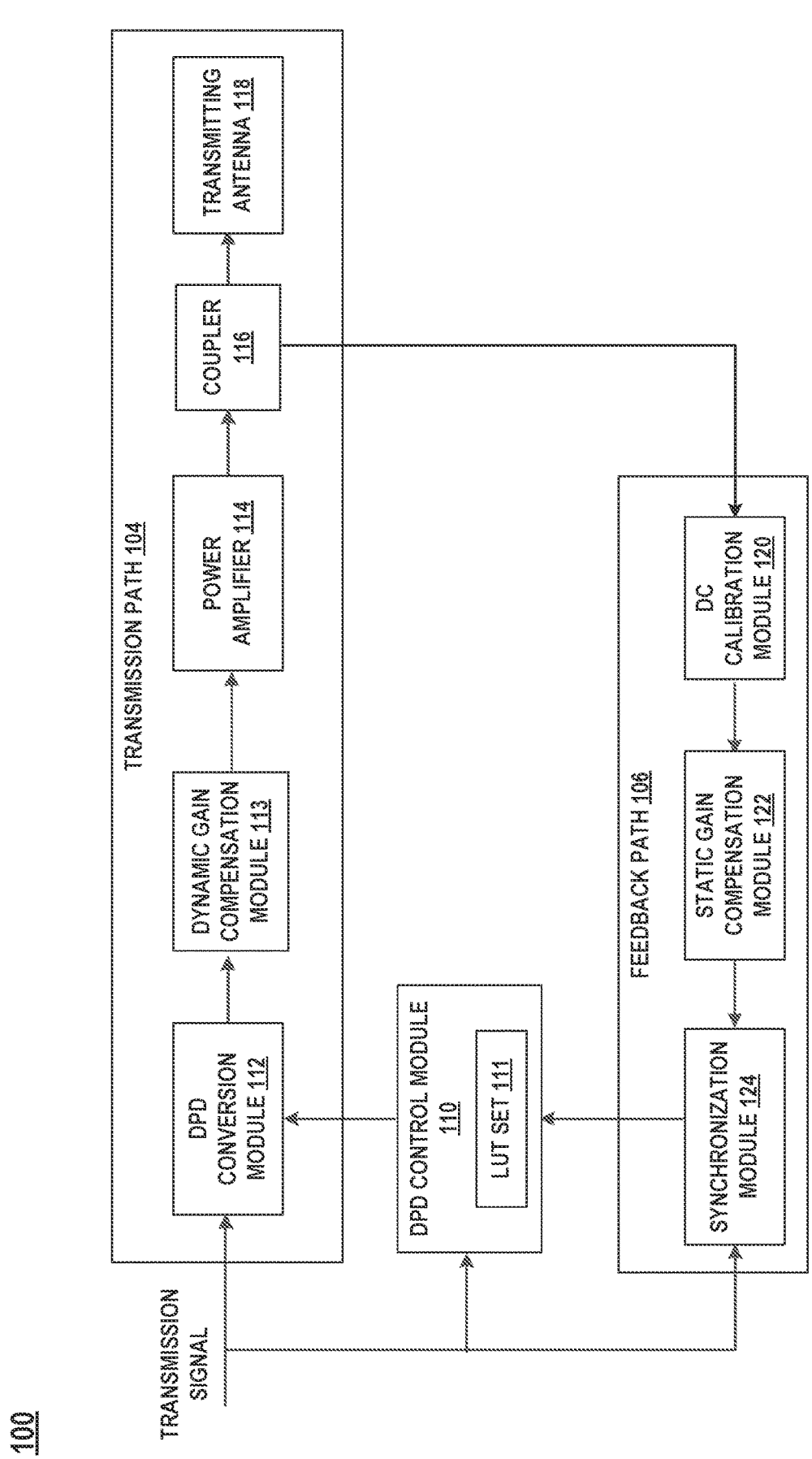
FIG. 1A illustrates a block diagram of an exemplary device for wireless transmission, according to some aspects of the present disclosure.

The present disclosure will be described with reference to the accompanying drawings.

DETAILED DESCRIPTION

Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosures can be combined, adjusted, and modified with one another and in ways not specifically depicted in the drawings, such that these combinations, adjustments, and modifications are within the scope of the present disclosure.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In some cases, nonlinear characteristics of a power amplifier may incur distortion to a digital modulated signal in a transmitter of a wireless communication system. This distortion may affect digital demodulation of the signal in a receiver and may incur in-band distortion, resulting in an increase of a bit error rate (BER) and a decrease in the data transmission rate of the wireless communication system. The nonlinear characteristics of the power amplifier may also cause a spectral hyperplasia phenomenon, leading to interference with adjacent channels. Besides, with respect to a peak-to-average power ratio, orthogonal frequency division multiplexing (OFDM), orthogonal frequency-division multiple access (OFDMA), or other baseband transmission techniques under wireless standards such as WIFI5 or WIFI6 may be likely to have occasional peak powers. In this case, the influence of the nonlinear effect of the power amplifier on the wireless communication system may be serious. Out-of-band spectrum spurs may occur, and an error vector magnitude (EVM) of an entire waveform may be expanded, leading to an increased BER.

To address one or more of the aforementioned issues, the present disclosure introduces a solution in which a DPD conversion module is cascaded with a power amplifier in a transmission path of a wireless transmitting device. The device may include the transmission path configured to transmit a transmission signal, a feedback path configured to generate a feedback signal through a coupling of the transmission signal, and a DPD control module configured to adaptively adjust a pre-distortion processing strategy based on an amplitude difference and a phase difference between the transmission signal and the feedback signal. Through a combined application of the DPD conversion module and the power amplifier in the transmission path, nonlinear characteristics of the DPD conversion module and the power amplifier can be combined and counteract with each other. Thus, the device can achieve high linearity without distortion. As a result, the BER of data transmission can be reduced, and the data transmission rate of the device can be improved. Out-of-band spectrum spurs may be reduced, and the EVM can be improved. Therefore, the transmitting performance of the device can be improved.

Consistent with certain aspects of the disclosure, the term "near real time" may refer to a processing of data that quickly responds to an event with a slight delay. The slight delay can be a delay of microseconds (μs), milliseconds (ms), seconds or minutes, etc., depending on various factors such as computing capabilities, available memory space, and a sampling rate of signals, etc. For example, the pre-distortion processing described herein can be performed in near real time with a delay of milliseconds.

FIG. 1A illustrates a block diagram of an exemplary device 100 for wireless transmission, according to some aspects of the present disclosure. Device 100 may include a transmission path 104, a feedback path 106, and a DPD control module 110. In some implementations, device 100 may be a wireless transmitting device (e.g., a wireless transmitter) or a wireless transceiver. It is understood that device 100 may include any other suitable components of a wireless transmitting device or a wireless transceiver, which are not shown in the figure.

Transmission path 104 may be configured to process a transmission signal and transmit the processed transmission signal through an antenna (e.g., a transmitting antenna 118).

Transmission path 104 may include one or more of a DPD conversion module 112, a dynamic gain compensation module 113, a power amplifier 114, a coupler 116, and transmitting antenna 118.

DPD conversion module 112 may receive a transmission signal and may be configured to perform pre-distortion processing on an amplitude and a phase of the transmission signal based on a pre-distortion processing strategy. DPD conversion module 112 may receive the pre-distortion processing strategy from DPD control module 110, which is described below in more detail.

In some implementations, the pre-distortion processing strategy may include an amplitude pre-distortion processing strategy used for performing the pre-distortion processing on the amplitude of the transmission signal. For example, the amplitude pre-distortion processing strategy may include a modified amplitude value for the transmission signal, which can be determined based on a current amplitude value of the transmission signal. The current amplitude value can be an amplitude value of the transmission signal at a current timestamp. Then, DPD conversion module 112 may change the amplitude of the transmission signal from the current amplitude value to the modified amplitude value based on the amplitude pre-distortion processing strategy. In another example, the amplitude pre-distortion processing strategy may include an amplitude weight for the amplitude of the transmission signal, which can be determined based on the current amplitude value of the transmission signal. Then, DPD conversion module 112 may be configured to multiply the current amplitude value of the transmission signal by the amplitude weight, so that the amplitude of the transmission signal can have the modified amplitude value.

In some implementations, the pre-distortion processing strategy may also include a phase pre-distortion processing strategy used for performing the pre-distortion processing on the phase of the transmission signal. For example, the phase pre-distortion processing strategy may include a modified phase value for the transmission signal, which can be determined based on the current amplitude value of the transmission signal. Then, DPD conversion module 112 may be configured to change the phase of the transmission signal from a current phase value to the modified phase value based on the phase pre-distortion processing strategy. The current phase value can be a phase value of the transmission signal at a current timestamp. In another example, the phase pre-distortion processing strategy may include a phase weight for the phase of the transmission signal, which can also be determined based on the current amplitude value of the transmission signal. Then, DPD conversion module 112 may be configured to multiply the current phase value of the transmission signal by the phase weight, so that the phase of the transmission signal can have the modified phase value.

Dynamic gain compensation module 113 may be configured to compensate a gain change caused by a temperature variation. Specifically, during a transmitting process of data frames, the temperature of circuits in device 100 may increase gradually due to accumulated power consumption in the transmitting process. For example, the temperature of power amplifier 114 may increase, leading to a gain change in power amplifier 114. This gain change caused by the temperature variation may be referred to as a dynamic gain error. The dynamic gain error may be tracked and compensated within the same data frame in real time or near real time. Otherwise, a gain of transmission path 104 may be varied gradually as the transmitting time goes by, which may cause the EVM of the transmission signal to become worse and worse and may have a great impact on the demodulation of long packets on a receiver side. In this case, dynamic gain compensation module 113 may be configured at a downstream of DPD conversion module 112 (or, at an upstream of power amplifier 114) to compensate for the gain change (or the dynamic gain error) caused by the temperature variation.

For example, dynamic gain compensation module 113 may provide a dynamic gain to the transmission signal to compensate for the gain change in transmission path 104, such that an output power of power amplifier 114 can be stabilized and not varied due to the gain change. Besides, dynamic gain compensation module 113 may be connected after DPD conversion module 112, so that the dynamic gain offered by dynamic gain compensation module 113 does not affect the performance of DPD conversion module 112. In this case, the dynamic gain compensation provided by dynamic gain compensation module 113 and the pre-distortion processing provided by DPD conversion module 112 can be independent from each other, which may improve performances of both dynamic gain compensation module 113 and DPD conversion module 112.

In some implementations, an initial value of the dynamic gain can be configured as 1 (or, 0 dB) in a first initial time period of each frame, indicating that no dynamic gain compensation is imposed on the transmission signal in the first initial time period of each frame. For example, during the first initial time period of each frame, the temperature variation is relatively small (because the transmission of the frame just starts), and so, the influence of the temperature variation on the performance of power amplifier 114 is relatively small. There is no need to perform the dynamic gain compensation. Thus, dynamic gain compensation module 113 may be configured to be activated after the first initial time period of each frame. For example, dynamic gain compensation module 113 may be configured to provide a dynamic gain that is greater than 1 (or, greater than 0 dB) after the first initial time period of each frame.

In some implementations, dynamic gain compensation module 113 may be configured to update the dynamic gain in response to the amplitude of the transmission signal being in a linear region of power amplifier 114. The linear region of power amplifier 114 may be an input amplitude region of power amplifier 114 where a gain of power amplifier 114 keeps unchanged or substantially unchanged (e.g., within a change of ±5%, 10%, or another suitable value). When an amplitude value of the transmission signal is within the linear region of power amplifier 114, dynamic gain compensation module 113 may track and update the dynamic gain so that an influence of the non-linear characteristics of power amplifier 114 on the dynamic gain compensation can be avoided or reduced.

Power amplifier 114 may be coupled to a downstream of DPD conversion module 112 (or a downstream of dynamic gain compensation module 113) and configured to amplify the power of the transmission signal. For example, power amplifier 114 may be a radio frequency (RF) power amplifier, a direct current (DC) power amplifier, or any other suitable type of power amplifier.

Coupler 116 may be coupled to a downstream of power amplifier 114. For example, coupler 116 may be coupled to an output of power amplifier 114. In some implementations, coupler 116 may be a coupler circuit including one or more circuit elements such as a wire, a resistor, a capacitor, an inductor, etc. The transmission signal that is processed by power amplifier 114 and outputted from power amplifier 114 may go through coupler 116, and may be transmitted to a receiver through transmitting antenna 118. The transmission signal may include a WIFI4 signal, a WIFI5 signal, a WIFI6 signal, or any other suitable wireless signal.

Feedback path 106 may be coupled to transmission path 104 at the downstream of the power amplifier 114 through coupler 116. Feedback path 106 may be configured to generate a feedback signal through a coupling of the transmission signal at coupler 116. In some implementations, feedback path 106 may include one or more of a DC calibration module 120, a static gain compensation module 122, and a synchronization module 124.

DC calibration module 120 may be configured to calibrate a DC value of the feedback signal based on an amplitude-to-amplitude curve of power amplifier 114 in a linear region. The amplitude-to-amplitude curve of power amplifier 114 may depict a relationship between an input amplitude and an output amplitude of power amplifier 114 (e.g., as shown in FIG. 3B below). In an ideal situation, when the input amplitude of power amplifier 114 is in the linear region, the amplitude-to-amplitude curve in the linear region can be a straight line that goes through an origin. However, in practice, the output amplitude of power amplifier 114 may have a non-zero value when the input amplitude of power amplifier 114 is zero. This non-zero value may be incurred by a DC value of the feedback signal. Thus, DC calibration module 120 may calibrate or compensate the DC value of the feedback signal based on this non-zero value.

In some implementations. DC calibration module 120 may be further configured to calibrate the DC value of the feedback signal using a short training field (STF) signal. For example, different data bits may have different DC components, and the DC value of the feedback signal may be impacted by the different DC components of the different data bits. However, a DC component of an STF signal can have a zero value or a known fixed value. By using the STF signal to calibrate the DC value of the feedback signal, an influence of the DC components of the different data bits on the DC value of the feedback signal can be avoided or reduced. Besides, peak amplitudes of the STF signal are relatively small (e.g., within the linear region of power amplifier 114), such that the STF signal may not be affected by the nonlinear characteristics of power amplifier 114.

In some implementations, a linear gain of an entire link passage of device 100 (including transmission path 104 and feedback path 106) may not be 1 (or 0 dB). The linear gain may have a value within several dBs and may be referred to as a static gain error. This static gain error may be unchanged within a transmitting process of an entire data frame or different data frames. Static gain compensation module 122 may be configured to compensate for this static gain error.

Static gain compensation module 122 may be included in feedback path 106 rather than transmission path 104, such that operation of static gain compensation module 122 may not affect the gain of transmission path 104 (or, the gain of power amplifier 114). Static gain compensation module 122 may be activated during a second initial time period of each frame. Both the first and second initial time periods of each frame may start at the beginning of each frame. The second initial time period of each frame may be shorter than or equal to the first initial time period of each frame.

Static gain compensation module 122 may be configured to track and update a static gain of the feedback signal during the second initial time period of each frame and hold or keep the static gain after the second initial time period of each frame. For example, within a particular initial time period of each frame (e.g., within a dozen, dozens, or hundreds of μs from a start of the frame), static gain compensation module 122 may track and update the static gain, and meanwhile, dynamic gain compensation module 113 may not track the dynamic gain and keep the dynamic gain to be 1 (or 0 dB). After the particular initial time period of each frame, static gain compensation module 122 may hold the static gain and stop updating the static gain, and dynamic gain compensation module 113 may start to track and update the dynamic gain. In this case, the static gain compensation and the dynamic gain compensation may not interfere with each other. Besides, within the particular initial time period of each frame, an operation time of power amplifier 114 is relatively short and the influence of the temperature variation on the performance of power amplifier 114 is small. Thus, during the particular initial time period of each frame, there is no need to track and update the dynamic gain, and only the static gain is tracked and updated.

Synchronization module 124 may be configured to synchronize the feedback signal with the transmission signal. Specifically, synchronization module 124 may correlate the transmission signal that is inputted into transmission path 104 with the feedback signal that is outputted from static gain compensation module 122. Then, synchronization module 124 may determine a delay between the transmission signal and the feedback signal. Specifically, synchronization module 124 may determine the delay as a timestamp difference between a timestamp of the transmission signal and a timestamp of the feedback signal. For example, synchronization module 124 may correlate the feedback signal with the transmission signal to obtain correlated peak values (or one or more values close to the correlated peaks), and perform an interpolating or fitting operation on the correlated peak values (or one or more values close to the correlated peaks) to obtain timing information of an integer part and timing information of a fractional part. The delay between the transmission signal and the feedback signal may include the timing information of the integer part and the timing information of the fractional part. Then, synchronization module 124 may synchronize the feedback signal with the transmission signal based on the timing information of the integer part and the timing information of the fractional part. For example, synchronization module 124 may perform an interpolating operation on the feedback signal based on the timing information of the fractional part (e.g., as shown below using the following expressions (1) and (2)) and may perform a delay operation on the transmission signal using the timing information of the integer part through register delays, so that the feedback signal and the transmission signal are synchronized with each other.

In some implementations, synchronization module 124 may include a Farrow filter to implementation a synchronization between the feedback signal and the transmission signal. The Farrow filter may be implemented based on the timing information of the fractional part. For example, assuming that the timing information of the fractional part at a current timestamp n is θ. Coefficients of the Farrow filter can be obtained using the following expression (1):

$$\begin{cases} a_1(\theta) = \alpha\theta^2 - \alpha\theta \\ a_0(\theta) = -\alpha\theta^2 + (\alpha - 1)\theta + 1 \\ a_{-1}(\theta) = -\alpha\theta^2 + (\alpha + 1)\theta \\ a_{-2}(\theta) = \alpha\theta^2 - \alpha\theta \end{cases} \quad (1)$$

In the above expression (1), α denotes a parameter for determining the coefficients $a_i(\theta)$ of the Farrow filter with $-2 \leq i \leq 1$. The feedback signal outputted from the Farrow filter can be obtained using the following expression (2):

$$y_{fb}(n) = \sum_{i=-2}^{1} a_i(\theta) x_{fb}(n+1+i). \quad (2)$$

In the above expression (2), $x_{fb}(n+1+i)$ denotes the feedback signal inputted to the Farrow filter at a timestamp n+1+i. $y_{fb}(n)$ denotes the feedback signal outputted from the Farrow filter at the current timestamp n. $y_{fb}(n)$ can be obtained as a weighted sum of $x_{fb}(n+1+i)$ using the coefficients of the Farrow filter, with $-2 \leq i \leq 1$. Then, synchronization module 124 may adjust the transmission signal using the timing information of the integer part through register delays, so that the feedback signal $y_{fb}(n)$ outputted from the Farrow filter is synchronized with the transmission signal adjusted using the timing information of the integer part.

In some implementations, the timing information of the integer part and the timing information of the fractional part may be determined when the amplitude of the transmission signal is in a linear region of power amplifier 114. In this case, an impact of the nonlinear characteristics of power amplifier 114 on the performance of synchronization module 124 can be reduced or eliminated, so that accuracy of the synchronization may be improved.

DPD control module 110 may be coupled to feedback path 106 (e.g., coupled to synchronization module 124 of feedback path 106) and DPD conversion module 112. In some implementations, before DPD conversion module 112 performs the pre-distortion processing on the transmission signal, DPD control module 110 may be configured to determine the amplitude pre-distortion processing strategy from an amplitude-to-amplitude (AM-AM) mapping table based on the amplitude of the transmission signal. DPD control module 110 may also be configured to determine the phase pre-distortion processing strategy from an amplitude-to-phase (AM-PM) mapping table based on the amplitude of the transmission signal. The AM-AM mapping table and the AM-PM mapping table may be included in a lookup table (LUT) set 111. LUT set 111 may be stored in a register or a memory of device 100 and may be updated in an adaptive manner as described below in more detail.

Consistent with certain aspects of the disclosure, the AM-AM mapping table may include corresponding amplitude pre-distortion processing strategies for different amplitude values. In some implementations, each amplitude value may correspond to an AM-AM value stored in the AM-AM mapping table, and this AM-AM value can include a modified amplitude value or an amplitude weight corresponding to the amplitude value. For example, based on a current amplitude value of the transmission signal, a modified amplitude value for the transmission signal can be obtained from the AM-AM mapping table. In another example, based on the current amplitude value of the transmission signal, an amplitude weight for the transmission signal can be obtained from the AM-AM mapping table, so that the modified amplitude value for the transmission signal can be obtained by multiplying the current amplitude value with the amplitude weight. Thus, the AM-AM mapping table may be used to map the current amplitude value of the transmission signal to the modified amplitude value of the transmission signal.

Consistent with certain aspects of the disclosure, the AM-PM mapping table may include corresponding phase pre-distortion processing strategies for different amplitude values. In some implementations, each amplitude value may correspond to an AM-PM value stored in the AM-PM mapping table, and this AM-PM value can include a modified phase value or a phase weight corresponding to the amplitude value. For example, based on the current amplitude value of the transmission signal, a modified phase value for the transmission signal can be obtained from the AM-PM mapping table. In another example, based on the current amplitude value of the transmission signal, a phase weight for the transmission signal can be obtained from the AM-PM mapping table, so that the modified phase value for the transmission signal can be obtained by multiplying the current phase value with the phase weight. Thus, the AM-PM mapping table may be used to map the current phase value of the transmission signal to the modified phase value of the transmission signal based on the current amplitude value of the transmission signal.

In some implementations, DPD control module 110 may be configured to adjust the amplitude pre-distortion processing strategy and the phase pre-distortion processing strategy based on an amplitude difference and a phase difference between the transmission signal and the feedback signal. For example, DPD control module 110 may update the AM-AM mapping table and the AM-PM mapping table based on the amplitude difference and the phase difference between the transmission signal and the feedback signal. Specifically, DPD control module 110 may determine an amplitude value of the transmission signal at a current timestamp. DPD control module 110 may determine an AM-AM value with respect to the amplitude value for a next timestamp based on (1) a corresponding AM-AM value with respect to the amplitude value for the current timestamp and (2) the amplitude difference between the transmission signal and the feedback signal at the current timestamp. Here, the transmission signal and the feedback signal at the current timestamp may be already synchronized and outputted from synchronization module 124. DPD control module 110 may also determine an AM-PM value with respect to the amplitude value for the next timestamp based on (1) a corresponding AM-PM value with respect to the amplitude value for the current timestamp and (2) the phase difference between the transmission signal and the feedback signal at the current timestamp.

For example, DPD control module 110 may determine the AM-AM value and the AM-PM value with respect to the amplitude value for the next timestamp in an adaptive manner using the following expression (3):

$$\begin{cases} F_M^{(n+1)}(a_i) = F_M^{(n)}(a_i) + S_M \cdot (a_i - a_f^{(n)}) \\ F_\varnothing^{(n+1)}(a_i) = F_\varnothing^{(n)}(a_i) + S_\varnothing \cdot [(V_i - V_f^{(n)}) \bmod 2\pi] \end{cases} \quad (3)$$

In the above expression (3), $a_i$ and $V_i$ denote the amplitude value and a phase value of the transmission signal at the current timestamp n, respectively. $a_f^{(n)}$ and $V_f^{(n)}$ denote an amplitude value and a phase value of the feedback signal at the current timestamp n, respectively. The phase values $V_i$ and $V_f^{(n)}$ are measured in radians. $F_M^{(n)}(a_i)$ denotes the corresponding AM-AM value at the current timestamp n with respect to the amplitude value $a_i$, and $F_M^{(n+1)}(a_i)$ denotes the AM-AM value at the next timestamp n+1 with respect to the amplitude value $a_i$. $F_\varnothing^{(n)}(a_i)$ denotes the corresponding AM-PM value at the current timestamp n with respect to the amplitude value $a_i$, and $F_\varnothing^{(n+1)}(a_i)$ denotes the AM-PM value at the next timestamp n+1 with respect to the amplitude value $a_i$. $S_M$ and $S_\varnothing$ denote updating step sizes of the AM-AM mapping table and the AM-PM mapping table, respectively, and mod $2\pi$ denotes a modulo of $2\pi$.

In some implementations, each of the updating step sizes $S_M$ and $S_\varnothing$ may have a positive value close to zero, such as 0.2, 0.1, 0.01, 0.001, etc. In practice, values of the updating step sizes $S_M$ and $S_\varnothing$ can be determined based on a convergence speed of the adaptive adjustment of the AM-AM mapping table and the AM-PM mapping table. In some implementations, initial AM-AM values stored in the AM-AM mapping table and initial AM-PM values stored in the AM-PM mapping table can be obtained from experimental measurements or from historical records.

In some implementations, upper and lower limits may be placed on the amplitude difference between $a_i$ and $a_f^{(n)}$ and the phase difference between $V_i$ and $V_f^{(n)}$, respectively. For example, when the amplitude difference is calculated using $a_i - a_f^{(n)}$ and is greater than a first amplitude difference threshold, the amplitude difference may be determined to be equal to the first amplitude difference threshold. When the amplitude difference is calculated using $a_i - a_f^{(n)}$ and is smaller than a second amplitude difference threshold, the amplitude difference may be determined to be equal to the second amplitude difference threshold. The first amplitude difference threshold can be a positive value, and the second amplitude difference threshold can be a negative value. Similarly, when the phase difference is calculated using $V_i - V_f^{(n)}$ and is greater than a first phase difference threshold, the phase difference may be determined to be equal to the first phase difference threshold. When the phase difference is calculated using $V_i - V_f^{(n)}$ and is smaller than a second phase difference threshold, the phase difference may be determined to be equal to the second phase difference threshold. The first phase difference threshold can be a positive value, and the second phase difference threshold can be a negative value. In this case, the stability of the adaptive adjustment of the AM-AM mapping table and the AM-PM mapping table can be improved. Thus, the performance of the adaptive adjustment can be improved.

In some implementations, a technique using recursive least squares (RLS), a least mean square (LMS) technique, or any other suitable technique can be used to implement the adaptive adjustment of the AM-AM mapping table and the AM-PM mapping table. The AM-AM mapping table and the AM-PM mapping table may be updated using any appropriate adaptive adjustment technique, such that DPD conversion module 112 may implement the pre-distortion processing on the transmission signal in real time or in near real time.

In some implementations. DPD control module 110 may be configured to update the AM-AM mapping table and the AM-PM mapping table at an edge of each symbol of the transmission signal. For example, the transmission signal can be obtained by modulating a stream of data bits using one or more appropriate modulation techniques such as OFDM, OFDMA, etc., and inputted into DPD conversion module 112 of transmission path 104. The transmission signal modulated using OFDM or OFDMA may include a stream of symbols, with each symbol including one or more subcarriers. By updating the AM-AM and AM-PM mapping tables at an edge of each symbol, the same AM-AM mapping table and the same AM-PM mapping table can be used to perform the pre-distortion processing for the entire symbol. This can be helpful for a demodulation process performed for the symbol on a receiver side. The transmitting performance of device 100 can be improved.

Figure 1B:
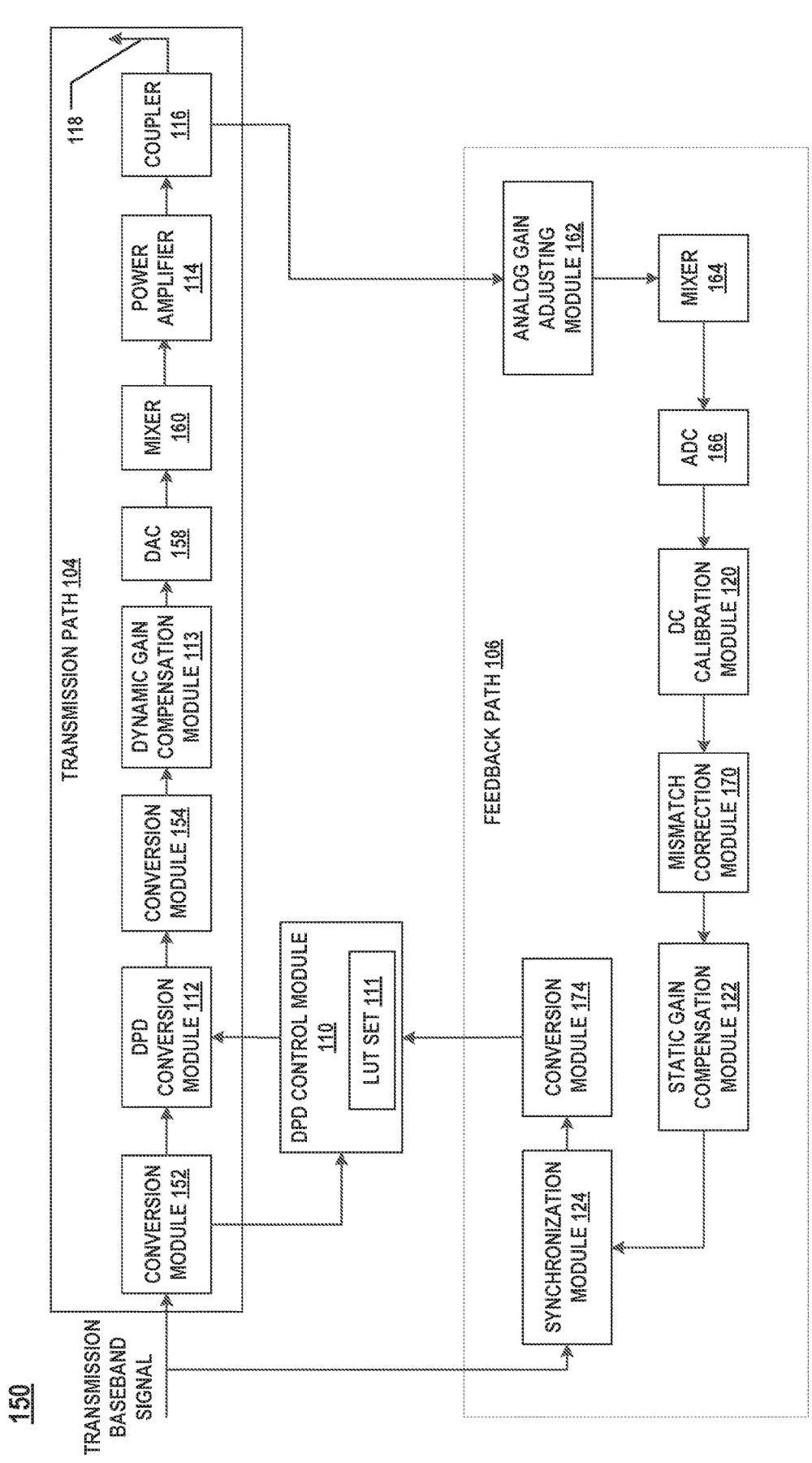
FIG. 1B illustrates a block diagram of another exemplary device for wireless transmission, according to some aspects of the present disclosure.

FIG. 1B illustrates a block diagram of another exemplary device 150 for wireless transmission, according to some aspects of the present disclosure. In some implementations, an transmission signal and a feedback signal described herein may include a transmission baseband signal and a feedback baseband signal, respectively. The transmission baseband signal may be modulated using, for example, OFDM, OFDMA, complementary code keying (CCK) that complies with the Institute of Electrical and Electronics Engineers (IEEE) 802.11b, or any other suitable modulation technique. Device 150 may include transmission path 104, feedback path 106, and DPD control module 110. In some implementations, device 150 may be a wireless transmitting device (e.g., a wireless transmitter) or a wireless transceiver. It is understood that device 150 may include any other suitable components of a wireless transmitting device or a wireless transceiver, which are not shown in the figure.

Transmission path 104 may include one or more of a conversion module 152, DPD conversion module 112, a conversion module 154, dynamic gain compensation module 113, a digital-to-analog converter (DAC) 158, a mixer 160, power amplifier 114, coupler 116, and transmitting antenna 118.

In some implementations, the transmission baseband signal may include an in-phase component and a quadrature component. Conversion module 152 may be configured to convert the in-phase component and the quadrature component of the transmission baseband signal into an amplitude and a phase of the transmission baseband signal. The amplitude and the phase of the transmission baseband signal may be inputted into DPD conversion module 112 and DPD control module 110.

DPD control module 110 may be configured to determine an amplitude pre-distortion processing strategy from the AM-AM mapping table based on the amplitude of the transmission baseband signal. DPD control module 110 may also be configured to determine a phase pre-distortion processing strategy from the AM-PM mapping table based on the amplitude of the transmission baseband signal.

DPD conversion module 112 may be configured to perform pre-distortion processing on the amplitude and the phase of the transmission baseband signal based on the amplitude pre-distortion processing strategy and the phase pre-distortion processing strategy, respectively. For example, DPD conversion module 112 may convert a current amplitude value of the transmission baseband signal to a modified amplitude value based on the amplitude pre-distortion processing strategy. DPD conversion module 112 may also convert a current phase value of the transmission baseband signal to a modified phase value based on the phase pre-distortion processing strategy.

Conversion module 154 may be configured to receive the transmission baseband signal from DPD conversion module 112, and may convert the amplitude and the phase of the transmission baseband signal to the in-phase component and the quadrature component of the transmission baseband signal again.

Dynamic gain compensation module 113 may be configured to provide a dynamic gain to the transmission baseband signal to compensate for a gain change caused by a temperature variation in transmission path 104. In some implementations, dynamic gain compensation module 113 may be configured to track and update the dynamic gain after a first initial time period of each frame. In some implementations, dynamic gain compensation module 113 may be configured to update the dynamic gain in response to the amplitude of the transmission baseband signal being in a linear region of power amplifier 114.

DAC 158 may be configured to convert the transmission baseband signal from a digital form to an analog form. Mixer 160 may be configured to perform a modulation operation on the transmission baseband signal to generate a radio frequency (RF) transmission signal. Power amplifier 114 may be configured to amplify a power of the RF transmission signal. The RF transmission signal outputted from power amplifier 114 may go through coupler 116, and may be transmitted to a receiver through transmitting antenna 118.

Feedback path 106 may be configured to generate an RF feedback signal through a coupling of the RF transmission signal at coupler 116. Feedback path 106 may be configured to generate a feedback baseband signal from the RF feedback signal, as described below in more detail. In some implementations, feedback path 106 may include one or more of an analog gain adjusting module 162, a mixer 164, an analog-to-digital converter (ADC) 166, DC calibration module 120, a mismatch correction module 170, static gain compensation module 122, synchronization module 124, and a conversion module 174.

Analog gain adjusting module 162 may be configured to adjust an amplitude of the RF feedback signal. Mixer 164 may be configured to perform a demodulation operation on the RF feedback signal to generate a feedback baseband signal ADC 166 may be configured to convert the feedback baseband signal from an analog form to a digital form. DC calibration module 120 may be configured to calibrate a DC value of the feedback baseband signal based on an amplitude-to-amplitude curve of power amplifier 114 in a linear region. In some implementations, DC calibration module 120 may be configured to calibrate the DC value of the feedback baseband signal using an STF signal.

Mismatch correction module 170 may be configured to correct a mismatch between an in-phase component and a quadrature component of the feedback baseband signal. Static gain compensation module 122 may be configured to track and update a static gain for the feedback baseband signal during a second initial time period of each frame and hold or keep the static gain after the second initial time period of each frame. Synchronization module 124 may be configured to synchronize the feedback baseband signal with the transmission baseband signal. Conversion module 174 may be configured to convert the in-phase component and the quadrature component of the feedback baseband signal into an amplitude and a phase of the feedback baseband signal.

DPD control module 110 may be configured to adjust the amplitude pre-distortion processing strategy and the phase pre-distortion processing strategy based on an amplitude difference and a phase difference between the transmission baseband signal and the feedback baseband signal. For example, DPD control module 110 may be configured to update the AM-AM mapping table and the AM-PM mapping table based on an amplitude difference and a phase difference between the transmission baseband signal and the feedback baseband signal.

Specifically. DPD control module 110 may determine an amplitude value of the transmission baseband signal at a current timestamp. DPD control module 110 may determine an AM-AM value with respect to the amplitude value for a next timestamp based on (1) a corresponding AM-AM value with respect to the amplitude value for the current timestamp and (2) the amplitude difference between the transmission baseband signal and the feedback baseband signal at the current timestamp. DPD control module 110 may also determine an AM-PM value with respect to the amplitude value for the next timestamp based on (1) a corresponding AM-PM value with respect to the amplitude value for the current timestamp and (2) the phase difference between the transmission baseband signal and the feedback baseband signal at the current timestamp. For example, DPD control module 110 may be configured to determine the AM-AM value and the AM-PM value with respect to the amplitude value for the next timestamp in an adaptive manner using the above expression (3).

Consistent with the description of FIGS. 1A-1B, through a combined application of DPD conversion module 112 and power amplifier 114 in transmission path 104, nonlinear characteristics of DPD conversion module 112 and power amplifier 114 can be combined and counteract with each other. Thus, device 100 or 150 can achieve high linearity without distortion. As a result, the BER of data transmission can be reduced, and a data transmission rate of device 100 or 150 can be improved. Furthermore, out-of-band spectrum spurs may be reduced, and the EVM can be improved.

Consistent with the description of FIGS. 1A-1B, device 100 or 150 may include one or more processors, one or more programmable logic devices (e.g., field programmable gate arrays (FPGAs)), and/or one or more circuits (e.g., application specific integrated circuits (ASICs)) for providing functions disclosed herein. For example, device 100 or 150 may include a system-on-chip (SoC) on a circuit board. The one or more processors may include a microprocessor unit (MPU), a microcontroller unit (MCU), a digital signal processor (DSP), or any other suitable type of processor.

Functions of various components or modules of device 100 or 150 may be implemented using hardware, software, or a combination thereof. In some implementations, the components or modules of device 100 or 150 may be hardware units (e.g., portions of an integrated circuit) configured to provide the functions described herein. For example, transmitting antenna 118 may be placed outside an integrated circuit (IC) and located on a printed circuit board (PCB), while the other components or modules of device 100 or 150 may be integrated into the IC on the PCB. In some implementations, the components or modules of device 100 or 150 may be software units (e.g., code or routines) implemented by a processor through executing at least part of a program. The program may be stored on a non-transitory computer-readable medium, such as a memory or a storage, and when executed by the processor, it may perform the functions described herein. In some implementations, the components or modules of device 100 or 150 may be implemented using a combination of hardware units and software units.

Figure 2:
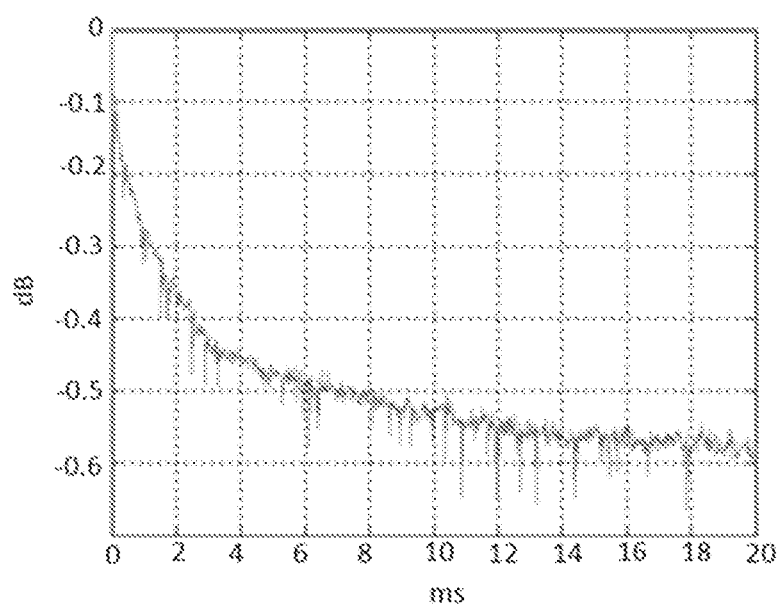
FIG. 2 is a graphical representation illustrating a gain of a power amplifier that changes over time, according to some aspects of the present disclosure.

FIG. 2 is a graphical representation 200 illustrating a gain of a power amplifier (e.g., power amplifier 114) that changes over time, according to some aspects of the present disclosure. For example, as more and more data bits in a frame are transmitted, the temperature of power amplifier 114 may increase, causing the gain of power amplifier 114 to decrease, as shown in FIG. 2. Thus, dynamic gain compensation module 113 may be configured to compensate this gain change of power amplifier 114 as described above, and the similar description will not be repeated here.

Figure 3A:
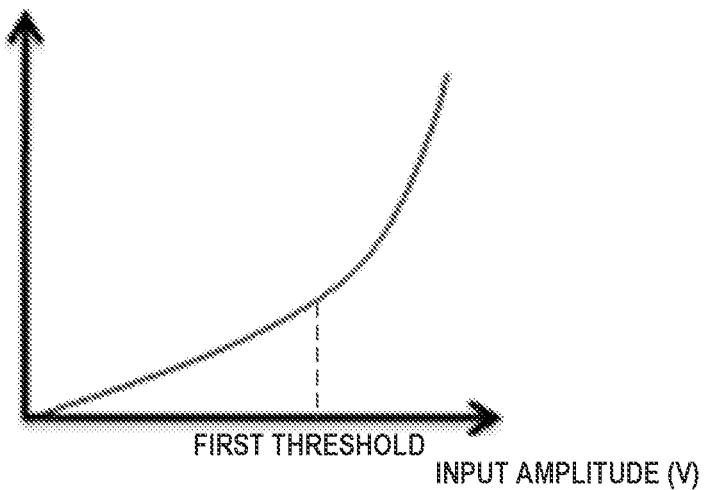
FIG. 3A is a graphical representation illustrating a relationship between an input amplitude and an output amplitude of a DPD conversion module, according to some aspects of the present disclosure.
Figure 3B:
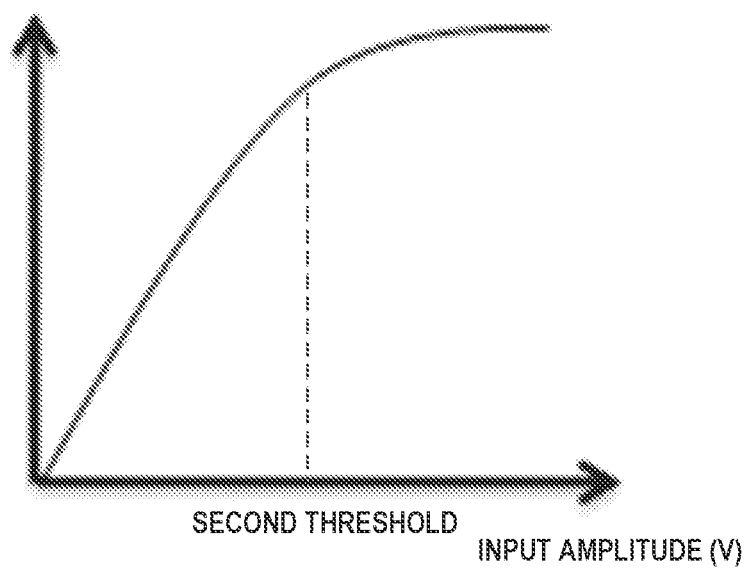
FIG. 3B is a graphical representation illustrating a relationship between an input amplitude and an output amplitude of a power amplifier, according to some aspects of the present disclosure.

FIG. 3A is a graphical representation 300 illustrating a relationship between an input amplitude and an output amplitude of a DPD conversion module (e.g., DPD conversion module 112), according to some aspects of the present disclosure. When the input amplitude of DPD conversion module 112 is relatively small (e.g., not greater than a first threshold), the output amplitude of DPD conversion module 112 has a linear relationship with the input amplitude. However, when the input amplitude of DPD conversion module 112 becomes large (e.g., greater than the first threshold), the output amplitude of DPD conversion module 112 grows exponentially with respect to the input amplitude.

FIG. 3B is a graphical representation 310 illustrating a relationship between an input amplitude and an output amplitude of a power amplifier (e.g., power amplifier 114), according to some aspects of the present disclosure. When the input amplitude of power amplifier 114 is relatively small (e.g., not greater than a second threshold), the output amplitude of power amplifier 114 has a linear relationship with the input amplitude. However, when the input amplitude of power amplifier 114 becomes large (e.g., greater than the second threshold), the output amplitude of power amplifier 114 approaches an upper limit gradually.

Figure 3C:
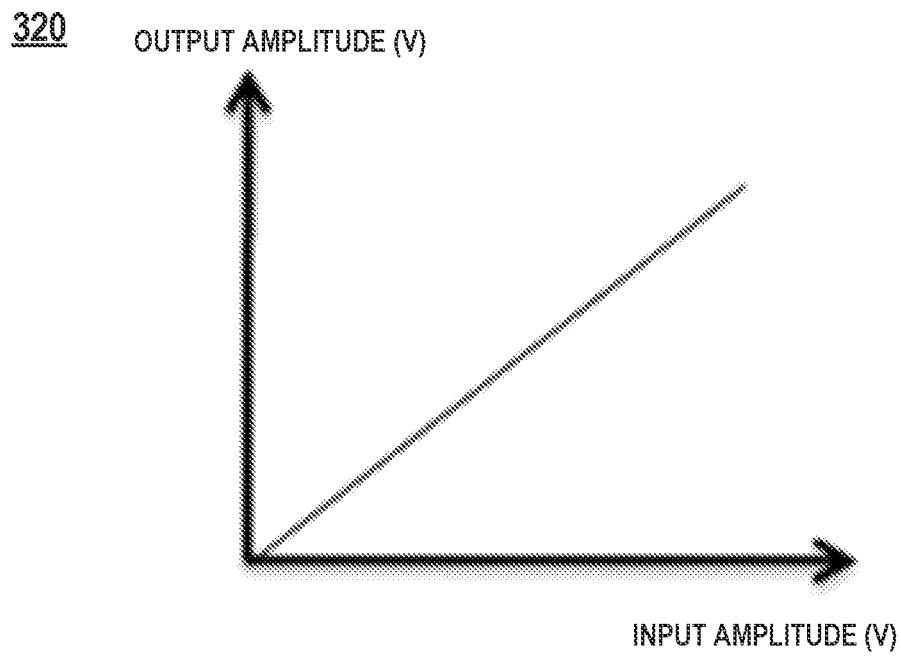
FIG. 3C is a graphical representation illustrating a relationship between an input amplitude and an output amplitude with a combined application of the DPD conversion module of FIG. 3A and the power amplifier of FIG. 3B, according to some aspects of the present disclosure.

FIG. 3C is a graphical representation 320 illustrating a relationship between an input amplitude and an output amplitude with a combined application of DPD conversion module 112 of FIG. 3A and power amplifier 114 of FIG. 3B, according to some aspects of the present disclosure. FIG. 3C illustrates that the input amplitude to the combined application of DPD conversion module 112 and power amplifier 114 may have a linear relationship with the output amplitude from the combined application of DPD conversion module 112 and power amplifier 114. The nonlinear characteristics of DPD conversion module 112 and power amplifier 114 may counteract each other.

Figure 4A:
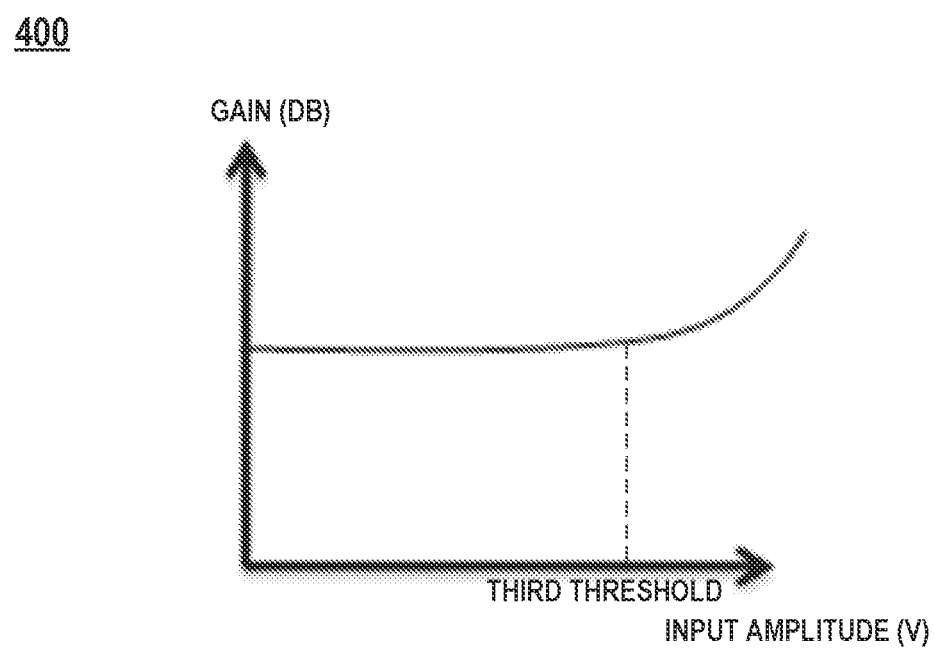
FIG. 4A is a graphical representation illustrating a relationship between a gain and an input amplitude of a DPD conversion module, according to some aspects of the present disclosure.

FIG. 4A is a graphical representation 400 illustrating a relationship between a gain and an input amplitude of a DPD conversion module (e.g., DPD conversion module 112), according to some aspects of the present disclosure. When the input amplitude of DPD conversion module 112 is relatively small (e.g., not greater than a third threshold), the gain of DPD conversion module 112 is almost constant. However, when the input amplitude of DPD conversion module 112 becomes large (e.g., greater than the third threshold), the gain of DPD conversion module 112 increases with respect to an increase of the input amplitude.

Figure 4B:
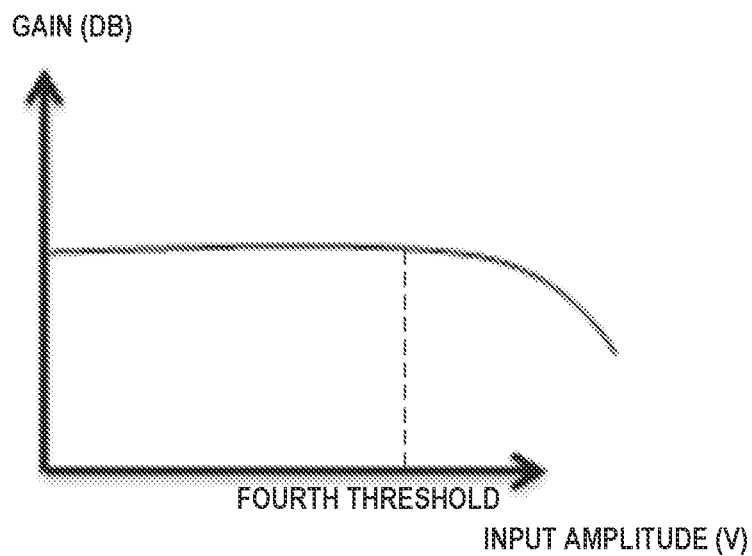
FIG. 4B is a graphical representation illustrating a relationship between a gain and an input amplitude of a power amplifier, according to some aspects of the present disclosure.

FIG. 4B is a graphical representation 410 illustrating a relationship between again and an input amplitude of a power amplifier (e.g., power amplifier 114), according to some aspects of the present disclosure. When the input amplitude of power amplifier 114 is relatively small (e.g., not greater than a fourth threshold), the gain of power amplifier 114 is almost constant. However, when the input amplitude of power amplifier 114 becomes large (e.g., greater than the fourth threshold), the gain of power amplifier 114 decreases with respect to an increase of the input amplitude.

Figure 4C:
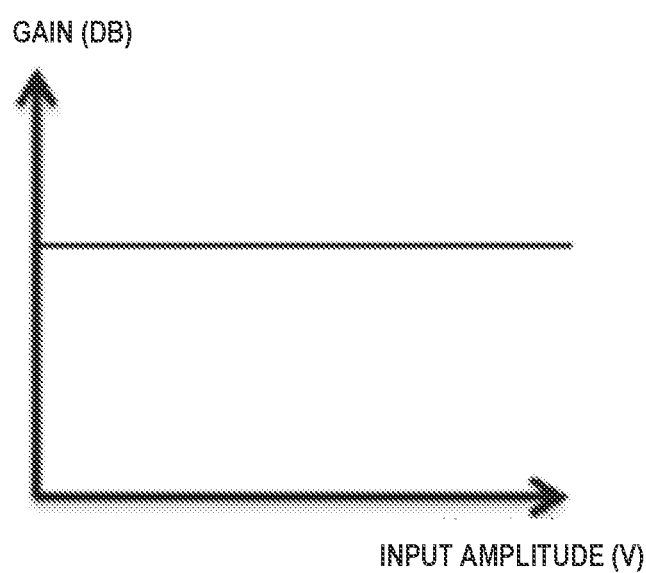
FIG. 4C is a graphical representation illustrating a relationship between a gain and an input amplitude with a combined application of the DPD conversion module of FIG. 4A and the power amplifier of FIG. 4B, according to some aspects of the present disclosure.

FIG. 4C is a graphical representation 420 illustrating a relationship between a gain and an input amplitude with a combined application of DPD conversion module 112 of FIG. 4A and power amplifier 114 of FIG. 4B, according to some aspects of the present disclosure. FIG. 4C illustrates that the gain from the combined application of DPD conversion module 112 and power amplifier 114 may keep constant with respect to the input amplitude to the combined application of DPD conversion module 112 and power amplifier 114. Thus, the nonlinear characteristics of DPD conversion module 112 and power amplifier 114 may counteract each other.

Figure 5:
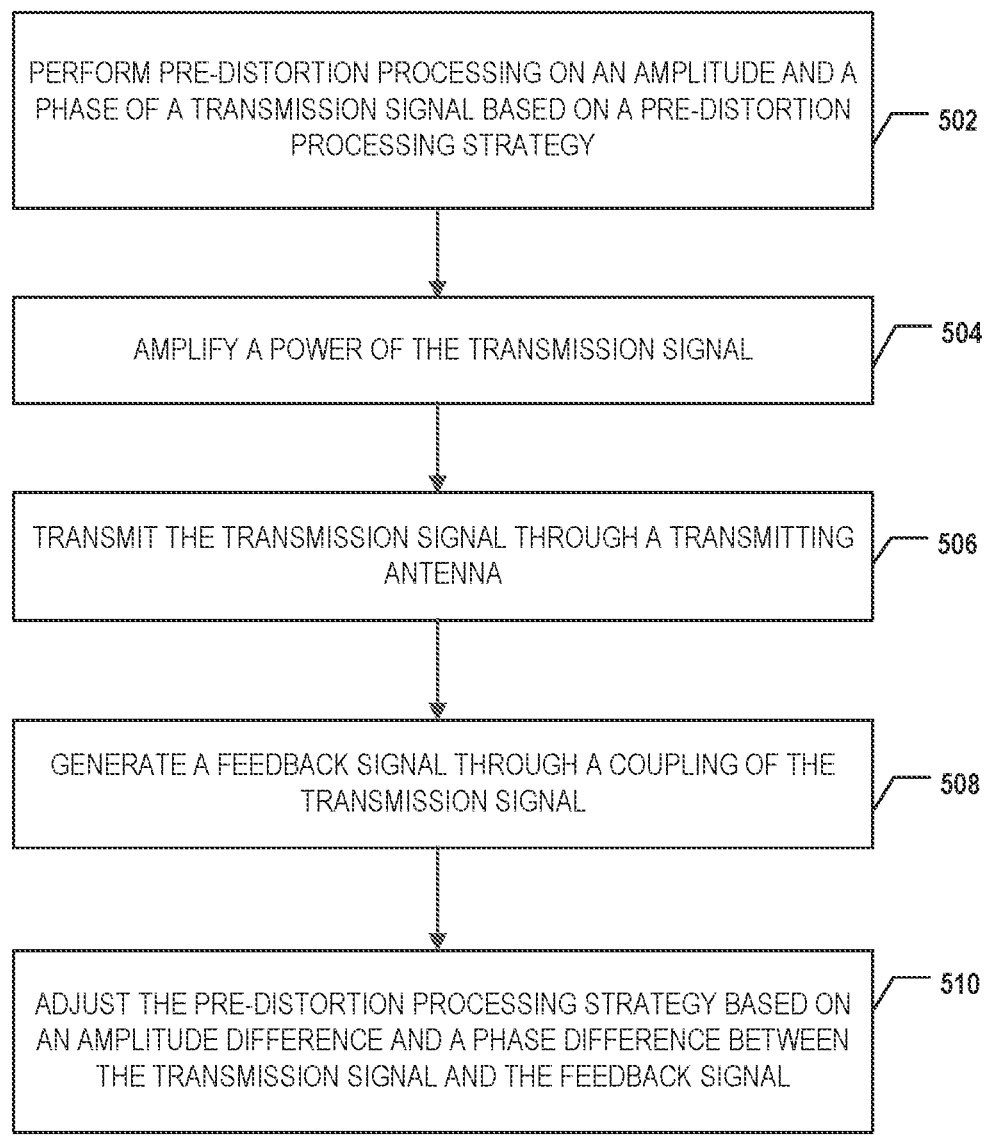
FIG. 5 illustrates a flowchart of an exemplary method for wireless transmission, according to some aspects of the present disclosure.

FIG. 5 illustrates a flowchart of an exemplary method 500 for wireless transmission, according to some aspects of the present disclosure. Method 500 may be implemented by device 100 or 150. It is understood that the operations shown in method 500 may not be exhaustive and that other operations can be performed as well before, after, or between any of the illustrated operations. Further, some of the operations may be performed simultaneously, or in a different order than shown in FIG. 5.

Referring to FIG. 5, method 500 starts at operation 502, in which pre-distortion processing is performed on an amplitude and a phase of a transmission signal based on a pre-distortion processing strategy. For example, DPD control module 110 may determine an amplitude pre-distortion processing strategy from an AM-AM mapping table based on an amplitude of the transmission signal. DPD control module 110 may also determine a phase pre-distortion processing strategy from an AM-PM mapping table based on the amplitude of the transmission signal. DPD conversion module 112 may perform the pre-distortion processing on the amplitude of the transmission signal based on the amplitude pre-distortion processing strategy. DPD conversion module 112 may also perform the pre-distortion processing on the phase of the transmission signal based on the phase pre-distortion processing strategy.

In some implementations, a gain change of the transmission signal caused by a temperature variation may be compensated. For example, a dynamic gain may be tracked and updated after a first initial time period of each frame and provided to the transmission signal.

Method 500 proceeds to operation 504, as illustrated in FIG. 5, in which a power of the transmission signal is amplified. For example, power amplifier 114 may amplify the power of the transmission signal.

Method 500 proceeds to operation 506, as illustrated in FIG. 5, in which the transmission signal is transmitted through transmitting antenna 118.

Method 500 proceeds to operation 508, as illustrated in FIG. 5, in which a feedback signal is generated through a coupling of the transmission signal. For example, feedback path 106 generates a feedback signal from the coupling of the transmission signal through coupler 116.

In some implementations, a DC value of the feedback signal may be calibrated based on an amplitude-to-amplitude curve of power amplifier 114 in a linear region. In some implementations, a static gain of the feedback signal may be tracked and updated during a second initial time period of each frame. In some implementations, the DC value of the feedback signal may be calibrated using an STF signal. In some implementations, the feedback signal may be synchronized with the transmission signal.

Method 500 proceeds to operation 510, as illustrated in FIG. 5, in which the pre-distortion processing strategy is adjusted based on an amplitude difference and a phase difference between the transmission signal and the feedback signal.

In some implementations, the AM-AM mapping table and the AM-PM mapping table may be updated based on the amplitude difference and the phase difference between the transmission signal and the feedback signal. Specifically, an amplitude value of the transmission signal at a current timestamp can be determined. An AM-AM value with respect to the amplitude value for a next timestamp can be determined based on a corresponding AM-AM with respect to the amplitude value for the current timestamp and the amplitude difference between the transmission signal and the feedback signal at the current timestamp. An AM-PM value with respect to the amplitude value for the next timestamp can be determined based on a corresponding AM-PM value with respect to the amplitude value for the current timestamp and the phase difference between the transmission signal and the feedback signal at the current timestamp. For example, the AM-AM value and the AM-PM value for the next timestamp can be determined in an adaptive manner using the above expression (3).

In some implementations, the AM-AM mapping table and the AM-PM mapping table may be updated at an edge of each symbol of the transmission signal.

Figure 6:
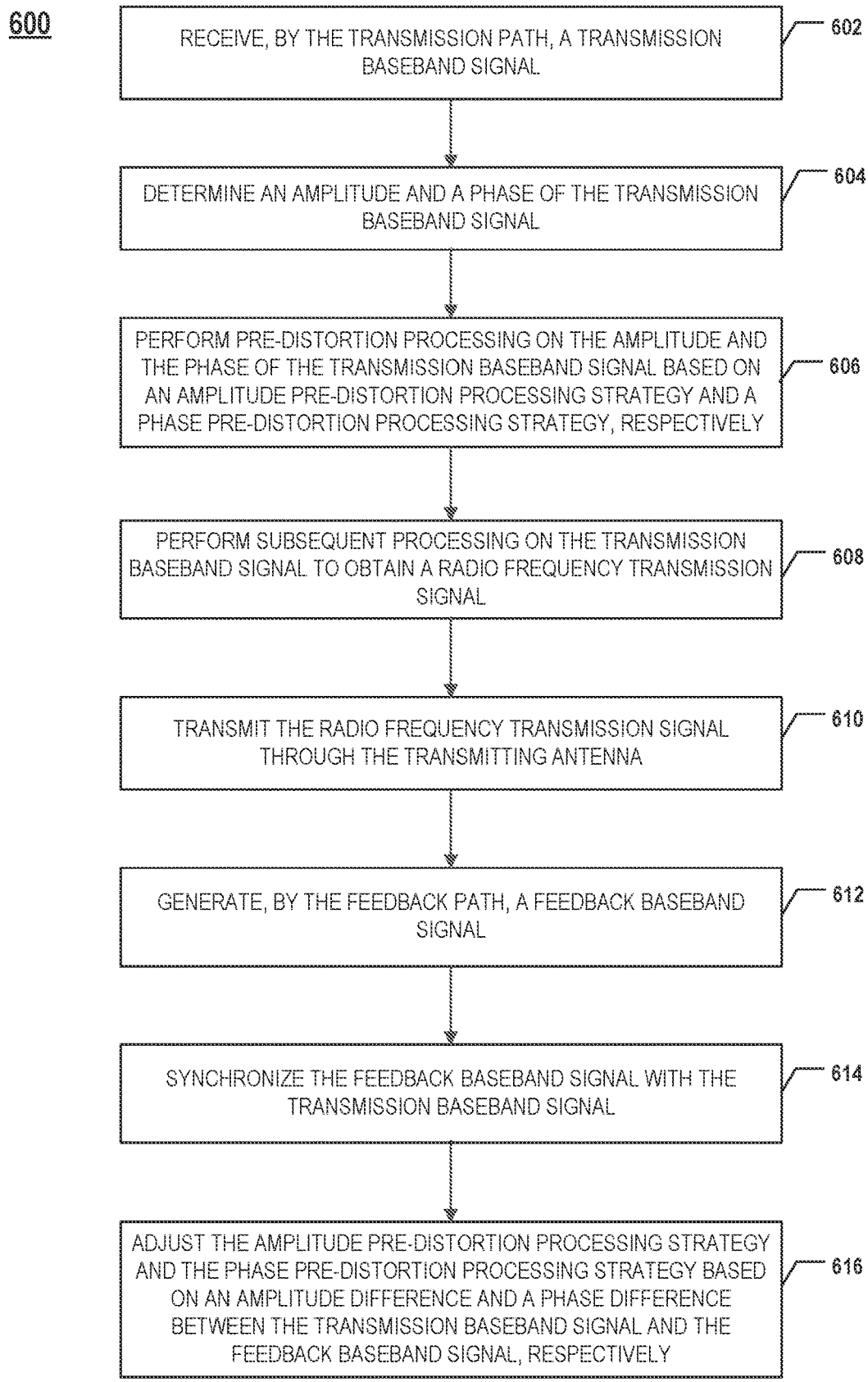
FIG. 6 illustrates a flowchart of another exemplary method for wireless transmission, according to some aspects of the present disclosure.

FIG. 6 illustrates a flowchart of another exemplary method 600 for wireless transmission, according to some aspects of the present disclosure. Method 600 may be implemented by device 100 or 150. It is understood that the operations shown in method 600 may not be exhaustive and that other operations can be performed as well before, after, or between any of the illustrated operations. Further, some of the operations may be performed simultaneously, or in a different order than shown in FIG. 6.

Referring to FIG. 6, method 600 starts at operation 602, in which a transmission baseband signal may be received by transmission path 104.

Method 600 proceeds to operation 604, as illustrated in FIG. 6, in which an amplitude and a phase of the transmission baseband signal are determined.

Method 600 proceeds to operation 606, as illustrated in FIG. 6, in which pre-distortion processing is performed on the amplitude and the phase of the transmission baseband signal based on an amplitude pre-distortion processing strategy and a phase pre-distortion processing strategy, respectively.

Method 600 proceeds to operation 608, as illustrated in FIG. 6, in which subsequent processing is performed on the transmission baseband signal to obtain an RF transmission signal. For example, the subsequent processing may include one or more operations performed by conversion module 154, dynamic gain compensation module 113, DAC 158, mixer 160, power amplifier 114, and coupler 116 disclosed herein.

Method 600 proceeds to operation 610, as illustrated in FIG. 6, in which the RF transmission signal is transmitted through transmitting antenna 118.

Method 600 proceeds to operation 612, as illustrated in FIG. 6, in which a feedback baseband signal is generated by feedback path 106. For example, an RF feedback signal may be generated through a coupling of the RF transmission signal. The RF feedback signal may be transformed into the feedback baseband signal. A DC value of the feedback baseband signal may be calibrated by DC calibration module 120. Static gain compensation module 122 may perform a static gain compensation on the feedback baseband signal.

Method 600 proceeds to operation 614, as illustrated in FIG. 6, in which the feedback baseband signal is synchronized with the transmission baseband signal.

Method 600 proceeds to operation 616, as illustrated in FIG. 6, in which the amplitude pre-distortion processing strategy and the phase pre-distortion processing strategy are adjusted based on an amplitude difference and a phase difference between the transmission baseband signal and the feedback baseband signal, respectively.

According to one aspect of the present disclosure, a device for wireless transmission includes a transmission path, a feedback path, and a DPD control module. The transmission path includes a DPD conversion module configured to perform pre-distortion processing on an amplitude and a phase of a transmission signal based on a pre-distortion processing strategy. The transmission path further includes a power amplifier coupled to a downstream of the DPD conversion module and configured to amplify a power of the transmission signal. The feedback path is coupled to the transmission path at the downstream of the power amplifier and configured to generate a feedback signal. The DPD control module is coupled to the feedback path and the DPD conversion module and configured to adjust the pre-distortion processing strategy based on an amplitude difference and a phase difference between the transmission signal and the feedback signal.

In some implementations, the pre-distortion processing strategy includes an amplitude pre-distortion processing strategy for performing the pre-distortion processing on the amplitude of the transmission signal. The pre-distortion processing strategy further includes a phase pre-distortion processing strategy for performing the pre-distortion processing on the phase of the transmission signal.

In some implementations, the DPD control module is configured to: determine the amplitude pre-distortion processing strategy from an AM-AM mapping table based on the amplitude of the transmission signal; and determine the phase pre-distortion processing strategy from an AM-PM mapping table based on the amplitude of the transmission signal.

In some implementations, to adjust the pre-distortion processing strategy, the DPD control module is further configured to update the AM-AM mapping table and the AM-PM mapping table based on the amplitude difference and the phase difference between the transmission signal and the feedback signal.

In some implementations, to update the AM-AM mapping table and the AM-PM mapping table, the DPD control module is further configured to: determine an amplitude value of the transmission signal at a current timestamp; determine an AM-AM value with respect to the amplitude value for a next timestamp based on a corresponding AM-AM value with respect to the amplitude value for the current timestamp and the amplitude difference between the transmission signal and the feedback signal at the current timestamp; and determine an AM-PM value with respect to the amplitude value for the next timestamp based on a corresponding AM-PM value with respect to the amplitude value for the current timestamp and the phase difference between the transmission signal and the feedback signal at the current timestamp.

In some implementations, the DPD control module may be configured to determine the AM-AM value and the AM-PM value with respect to the amplitude value for the next timestamp in an adaptive manner as follows:

$$\begin{cases} F_M^{(n+1)}(a_i) = F_M^{(n)}(a_i) + S_M \cdot (a_i - a_f^{(n)}) \\ F_\emptyset^{(n+1)}(a_i) = F_\emptyset^{(n)}(a_i) + S_\emptyset \cdot [(V_i - V_f^{(n)}) \bmod 2\pi] \end{cases},$$

where $a_i$ and $V_i$ denote the amplitude value and a phase value of the transmission signal at the current timestamp n, respectively. $a_f^{(n)}$ and $V_f^{(n)}$ denote an amplitude value and a phase value of the feedback signal at the current timestamp n, respectively. $F_M^{(n)}(a_i)$ denotes the corresponding AM-AM value with respect to the amplitude value $a_i$ for the current timestamp n, and $F_M^{(n+1)}(a_i)$ denotes the AM-AM value with respect to the amplitude value $a_i$ for the next timestamp n+1. $F_\emptyset^{(n)}(a_i)$ denotes the corresponding AM-PM value with respect to the amplitude value $a_i$ for the current timestamp n, and $F_\emptyset^{(n+1)}(a_i)$ denotes the AM-PM value with respect to the amplitude value $a_i$ for the next timestamp n+1. $S_M$ and $S_\emptyset$ denote updating step sizes of the AM-AM mapping table and the AM-PM mapping table, respectively, and mod $2\pi$ denotes a modulo of $2\pi$.

In some implementations, the DPD control module is configured to update the AM-AM mapping table and the AM-PM mapping table at an edge of each symbol of the transmission signal.

In some implementations, the transmission path further includes a dynamic gain compensation module configured at a downstream of the DPD conversion module to compensate a gain change caused by a temperature variation.

In some implementations, the dynamic gain compensation module is configured to be activated after a first initial time period of each frame to track and update a dynamic gain for the transmission signal.

In some implementations, the feedback path includes a static gain compensation module configured to be activated during a second initial time period of each frame to track and update a static gain for the feedback signal and configured to hold the static gain after the second initial time period of each frame.

In some implementations, the feedback path includes a DC calibration module configured to calibrate a DC value of the feedback signal based on an amplitude-to-amplitude curve of the power amplifier in a linear region.

In some implementations, the DC calibration module is further configured to calibrate the DC value of the feedback signal using an STF signal.

In some implementations, the feedback path includes a synchronization module configured to synchronize the feedback signal with the transmission signal.

In some implementations, the synchronization module includes a Farrow filter implemented based on timing information of an integer part and timing information of a fractional part. The timing information of the integer part and the timing information of the fractional part are determined in response to the amplitude of the transmission signal being in a linear region of the power amplifier.

In some implementations, the transmission signal includes a transmission baseband signal, and the feedback signal includes a feedback baseband signal.

In some implementations, the transmission signal includes a WIFI4 signal, a WIFI5 signal, or a WIFI6 signal.

According to another aspect of the present disclosure, a method for wireless transmission is disclosed. Pre-distortion processing is performed on an amplitude and a phase of a transmission signal based on a pre-distortion processing strategy. A power of the transmission signal is amplified. The transmission signal is transmitted through a transmitting antenna. A feedback signal is generated through a coupling of the transmission signal. The pre-distortion processing strategy is adjusted based on an amplitude difference and a phase difference between the transmission signal and the feedback signal.

In some implementations, the pre-distortion processing strategy includes an amplitude pre-distortion processing strategy for performing the pre-distortion processing on the amplitude of the transmission signal. The pre-distortion processing strategy further includes a phase pre-distortion processing strategy for performing the pre-distortion processing on the phase of the transmission signal.

In some implementations, the amplitude pre-distortion processing strategy is determined from an AM-AM mapping table based on the amplitude of the transmission signal. The phase pre-distortion processing strategy is determined from an AM-PM mapping table based on the amplitude of the transmission signal.

In some implementations, adjusting the pre-distortion processing strategy includes updating the AM-AM mapping table and the AM-PM mapping table based on the amplitude difference and the phase difference between the transmission signal and the feedback signal.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A device for wireless transmission, comprising:
   a transmission path comprising:
   a digital pre-distortion (DPD) conversion module configured to perform pre-distortion processing on an amplitude and a phase of a transmission signal based on a pre-distortion processing strategy; and
   a power amplifier coupled to a downstream of the DPD conversion module and configured to amplify a power of the transmission signal;
   a feedback path coupled to the transmission path at the downstream of the power amplifier and configured to generate a feedback signal, wherein the feedback path comprises a synchronization module configured to synchronize the feedback signal with the transmission signal; and
   a DPD control module coupled to the feedback path and the DPD conversion module, and configured to adjust the pre-distortion processing strategy based on an amplitude difference and a phase difference between the transmission signal and the feedback signal.

2. The device of claim 1, wherein the pre-distortion processing strategy comprises:
   an amplitude pre-distortion processing strategy for performing the pre-distortion processing on the amplitude of the transmission signal; and
   a phase pre-distortion processing strategy for performing the pre-distortion processing on the phase of the transmission signal.

3. The device of claim 2, wherein the DPD control module is configured to:
   determine the amplitude pre-distortion processing strategy from an amplitude-to-amplitude (AM-AM) mapping table based on the amplitude of the transmission signal; and
   determine the phase pre-distortion processing strategy from an amplitude-to-phase (AM-PM) mapping table based on the amplitude of the transmission signal.

4. The device of claim 3, wherein to adjust the pre-distortion processing strategy, the DPD control module is further configured to update the AM-AM mapping table and the AM-PM mapping table based on the amplitude difference and the phase difference between the transmission signal and the feedback signal.

5. The device of claim 4, wherein to update the AM-AM mapping table and the AM-PM mapping table, the DPD control module is further configured to:
   determine an amplitude value of the transmission signal at a current timestamp;
   determine an AM-AM value with respect to the amplitude value for a next timestamp based on a corresponding AM-AM value with respect to the amplitude value for the current timestamp and the amplitude difference between the transmission signal and the feedback signal at the current timestamp; and
   determine an AM-PM value with respect to the amplitude value for the next timestamp based on a corresponding AM-PM value with respect to the amplitude value for the current timestamp and the phase difference between the transmission signal and the feedback signal at the current timestamp.

6. The device of claim 5, wherein the DPD control module is configured to determine the AM-AM value and the AM-PM value for the next timestamp in an adaptive manner as follows:

$$\begin{cases} F_M^{(n+1)}(a_i) = F_M^{(n)}(a_i) + S_M \cdot (a_i - a_f^{(n)}) \\ F_\varnothing^{(n+1)}(a_i) = F_\varnothing^{(n)}(a_i) + S_\varnothing \cdot [(V_i - V_f^{(n)}) \bmod 2\pi] \end{cases},$$

$a_i$ and $V_i$ denote the amplitude value and a phase value of the transmission signal at the current timestamp n, respectively;
$a_f^{(n)}$ and $V_f^{(n)}$ denote an amplitude value and a phase value of the feedback signal at the current timestamp n, respectively;
$F_M^{(n)}(a_i)$ denotes the corresponding AM-AM value with respect to the amplitude value $a_i$ for the current timestamp n, and $F_M^{(n+1)}(a_i)$ denotes the AM-AM value with respect to the amplitude value $a_i$ for the next timestamp n+1;
$F_\varnothing^{(n)}(a_i)$ denotes the corresponding AM-PM value with respect to the amplitude value $a_i$ for the current timestamp n, and $F_\varnothing^{(n+1)}(a_i)$ denotes the AM-PM value with respect to the amplitude value $a_i$ for the next timestamp n+1;
$S_M$ and $S_\varnothing$ denote updating step sizes of the AM-AM mapping table and the AM-PM mapping table, respectively; and
mod $2\pi$ denotes a modulo of $2\pi$.

7. The device of claim 4, wherein the DPD control module is configured to update the AM-AM mapping table and the AM-PM mapping table at an edge of each symbol of the transmission signal.

8. The device of claim 1, wherein the transmission path further comprises a dynamic gain compensation module configured at a downstream of the DPD conversion module to compensate a gain change caused by a temperature variation.

9. The device of claim 8, wherein the dynamic gain compensation module is configured to be activated after a first initial time period of each frame to track and update a dynamic gain for the transmission signal.

10. The device of claim 1, wherein the feedback path comprises a static gain compensation module configured to be activated during a second initial time period of each frame to track and update a static gain for the feedback signal and configured to hold the static gain after the second initial time period of each frame.

11. The device of claim 1, wherein the feedback path comprises a direct current (DC) calibration module configured to calibrate a DC value of the feedback signal based on an amplitude-to-amplitude curve of the power amplifier in a linear region.

12. The device of claim 11, wherein the DC calibration module is further configured to calibrate the DC value of the feedback signal using a short training field (STF) signal.

13. The device of claim 1, wherein
the synchronization module comprises a Farrow filter implemented based on timing information of an integer part and timing information of a fractional part; and
the timing information of the integer part and the timing information of the fractional part are determined in response to the amplitude of the transmission signal being in a linear region of the power amplifier.

14. The device of claim 1, wherein the transmission signal comprises a transmission baseband signal, and the feedback signal comprises a feedback baseband signal.

15. The device of claim 1, wherein the transmission signal comprises a WIFI4 signal, a WIFI5 signal, or a WIFI6 signal.

16. A method for wireless transmission, comprising:
performing pre-distortion processing on an amplitude and a phase of a transmission signal based on a pre-distortion processing strategy;
amplifying a power of the transmission signal;
transmitting the transmission signal through a transmitting antenna;
generating, in a feedback path, a feedback signal through a coupling of the transmission signal, wherein the feedback signal in the feedback path is synchronized with the transmission signal; and
adjusting the pre-distortion processing strategy based on an amplitude difference and a phase difference between the transmission signal and the feedback signal.

17. The method of claim 16, wherein the pre-distortion processing strategy comprises:
an amplitude pre-distortion processing strategy for performing the pre-distortion processing on the amplitude of the transmission signal; and
a phase pre-distortion processing strategy for performing the pre-distortion processing on the phase of the transmission signal.

18. The method of claim 17, further comprising:
determining the amplitude pre-distortion processing strategy from an amplitude-to-amplitude (AM-AM) mapping table based on the amplitude of the transmission signal; and
determining the phase pre-distortion processing strategy from an amplitude-to-phase (AM-PM) mapping table based on the amplitude of the transmission signal.

19. The method of claim 18, wherein adjusting the pre-distortion processing strategy comprises updating the AM-AM mapping table and the AM-PM mapping table based on the amplitude difference and the phase difference between the transmission signal and the feedback signal.

20. The method of claim 19, wherein updating the AM-AM mapping table and the AM-PM mapping table comprises:
determining an amplitude value of the transmission signal at a current timestamp;
determining an AM-AM value with respect to the amplitude value for a next timestamp based on a corresponding AM-AM value with respect to the amplitude value for the current timestamp and the amplitude difference between the transmission signal and the feedback signal at the current timestamp; and
determining an AM-PM value with respect to the amplitude value for the next timestamp based on a corresponding AM-PM value with respect to the amplitude value for the current timestamp and the phase difference between the transmission signal and the feedback signal at the current timestamp.

* * * * *